Nov. 7, 1939.  J. R. MUNÉS ET AL  2,179,192

PNEUMATIC TIRE

Filed April 8, 1938

JUAN RAMON MUNES,
BRAULIO PEREZ MARCHANT
INVENTORS

BY Victor J. Evans & Co.
ATTORNEYS

Patented Nov. 7, 1939

2,179,192

UNITED STATES PATENT OFFICE 2,179,192

PNEUMATIC TIRE

Juán Ramón Munés and Braulio Pérez Marchant, Ilopango, San Salvador, Salvador

Application April 8, 1938, Serial No. 200,984

2 Claims. (Cl. 152—338)

This invention relates generally to pneumatic tires and more especially to an improved type of tire divided into compartments whereby danger resulting from puncture is at least largely minimized.

Heretofore, considerable danger has attended the use of pneumatic tires in land vehicles, airplanes and the like, due at least in a large part to the danger of destruction of the vehicle when traveling at high speed if the tire were punctured. For instance, automobiles equipped with the usual type of pneumatic tire have been known to leave the road and become totally wrecked upon accidental puncture of the tire while the vehicle was moving at relatively high speed. Many airplane disasters in landing have been ascribed to failure of pneumatic tires to function when the ship was first landed upon the field due to a puncture of the tire whereby it became deflated. In view of the danger provoked and aggravated by deflation of pneumatic tires of vehicles, it has become an important objective in the art of war to destroy the pneumatic tires on enemy equipment.

It is among the major objects of the present invention to provide a novel type of pneumatic tire wherein are included means for at least largely minimizing the danger of accidental or intentional total deflation of the pneumatic tire by puncture, whereby when a tire according to the present invention is accidentally punctured during use, or intentionally punctured as in warfare, a portion only of the tire will be subject to deflation and the remainder will be substantially unaltered, thereby permitting the vehicle to operate substantially as before.

It is also an important object of the present invention to provide a new and improved pneumatic tire characterized in that the resilient air-containing portions thereof are sub-divided into a plurality of segmental arcuately curved chambers.

It is also an object of the present invention to provide a pneumatic tire of the type aforesaid wherein the several chambers can be simultaneously inflated and deflated by means of a single valve when so desired.

It is also notable among the objects of the present invention to provide a new and improved type of valve for use upon the unit chambers and in conjunction with a new and improved type of main valve, whereby said first mentioned valves on the unit air chambers can be actuated by means including the second mentioned or main valve. It is a feature of both the main and unit valves according to the present invention that they are pneumatically actuable to transmit or permit the passage of fluid, such as a gas, in one direction; are self-sealing to prevent passage of fluid in the opposite direction and can be manually opened after sealing when desirable.

Other objects, features and advantages of the approved pneumatic tire according to the matter of the present invention will be apparent to those skilled in the art during the course of the following description wherein a specific embodiment of the present invention, herein illustrated, will be described, it being clearly understood however that the preferred embodiment of the present invention herein illustrated is given by way of example and is non-limitative.

Regarded in certain of its broader aspects, the present invention comprises an annular ring-shaped pneumatic tire sub-divided, by means including radially positioned walls, into a plurality of arcuately curved segmental unit chambers associated with each other by means including an annular check preferably disposed on the inner portion of said pneumatic tire; each of said unit chambers being provided with a valve pneumatically actuable for purposes of introducing fluid into said unit chamber and manually actuable for purposes of permitting fluid to leave said unit chamber; and a main valve associated with the chamber communicating with each of the unit chambers adapted to control the flow of fluid to and from said chamber and to manually actuate each and all of said unit valves associated with said unit chambers.

In order to facilitate a fuller and more complete understanding of the matter of the present invention the specific embodiment thereof, herein illustrated, will now be described.

Figure 1:
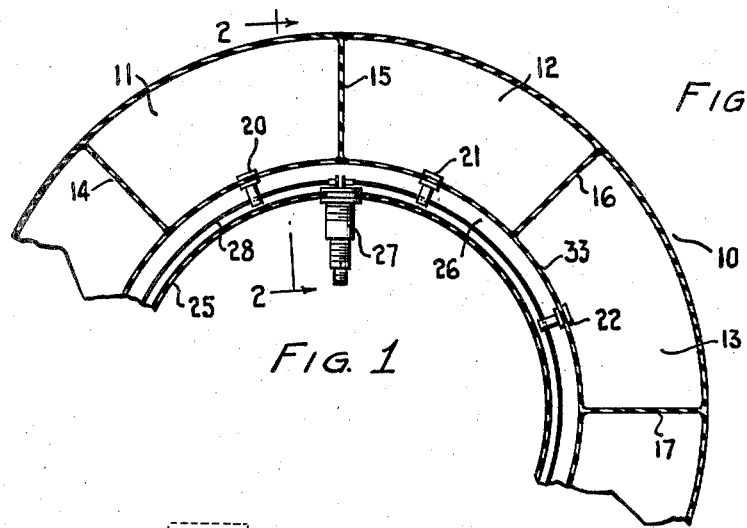
Fig. 1 is substantially a fragmentary sectional elevation of a pneumatic tire according to the present invention showing a main valve in position, associated with auxiliary valves controlling fluid positioned within unit chambers.
Figure 2:
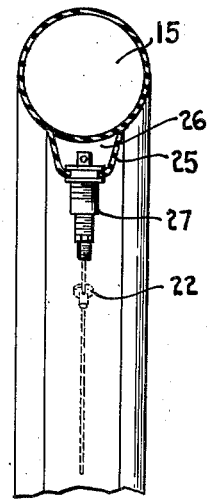
Fig. 2 is substantially a cross-sectional view of the structure illustrated in Fig. 1 taken along the line 2—2 thereof.

Referring then to the drawing and more especially to Figs. 1 and 2 thereof, it will be noted that the pneumatic tire generally designated by the numeral 10 comprises a plurality of chambers certain of which are designated at 11, 12 and 13, each of said chambers being arcuately curved and representing segmental portions of the tire, and being compounded or defined by the outer walls of the tire and radially disposed walls 14, 15, 16 and 17. It will be observed that the radially disposed walls are common to two chambers, that is to say for example, the wall 15 is common to the chambers 11 and 12, the wall 16 to the chambers 12 and 13, etc. Each of these chambers is substantially isolated from the others, that is to say, inflation or deflation of chamber 12, for example, would be substantially without effect upon the fluid content of chambers 11 and 13.

Each of the chambers 11, 12 and 13 is provided with a unit valve designated at 20, 21 and 22, respectively, it being understood of course, that other unit chambers would be similarly provided with unit valves and it also being understood that the number of unit chambers in the pneumatic tire is limited only by requirements of user and can include as large or as small a number of chambers as appears desirable.

A U-shaped annular member 25 associated with the walls of the tire 10 defines an annular pneumatic chamber 26 communicating with each and all of the unit valves, some of which are designated at 20, 21 and 22, and is provided with a main valve generally designated at 27, all substantially as shown, each of the unit valves being actuable to regulate fluid flow in one direction by means associated with the main valve 27 as will be hereinafter described, it being noted however, that the main valve 27 has associated therewith an annular resilient cable 28 extending throughout the chamber 26 and associated with each of the unit valves.

Figure 4:
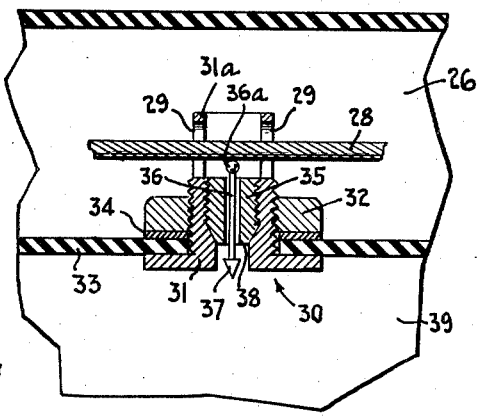
Fig. 4 is a vertical sectional view of an auxiliary unit valve according to the preferred embodiment of the present invention.

Referring now to Fig. 4 wherein the details of a typical unit valve are best illustrated, it will be noted that the valve proper generally designated at 30 comprises a flanged bored tubular member 31 threaded on the outside to receive an annular fastening member 32 which is adapted to hold said member 30 in position in an opening formed in the tire wall 33, a gasket 34 preferably being interposed between the fastening member 32 and a portion of the tire substantially as shown. The inner part of the member 31 is threaded to receive valve seat member 35 carrying a plunger valve 36 having valve portion 37 adapted to seat on the end part 38 of the member 35. When the pressure in the chamber 39 is greater than the pressure outside the valve in the chamber 26, the valve member 37 is pressed against the valve seat 38 whereby flow of fluid from the chamber 39 through the valve is at least largely precluded. Flow of fluid into the chamber 39 through the valve 30 is at least largely facilitated by positively moving the member 36 whereby the valve 37 is unseated from the part 38 of the member 35. This is accomplished preferably by means including a flexible cable 28 received in guide openings 29 formed in an extension portion 31a of the member 31 and abutting against the end part 36a of the member 36, substantially as shown, whereby movement of the cable 28 toward the tire wall 33 causes said valve 30 to open, permitting egress of fluid from the chamber 39. It is to be understood, of course, that the cable 28 is normally maintained out of contact with the portion 36a of the member 36 and is operated as aforesaid only when it is desired to divert the unit chamber associated with the unit valve referred to.

It is to be understood that the unit valve hereinbefore described is typical of the unit valves provided on each unit chamber of the pneumatic tire according to the present invention.

Cable 28 controlling deflation of the unit chambers is actuated by means including mechanism associated with the main valve 27 in the manner hereinafter to be described.

Figure 3:
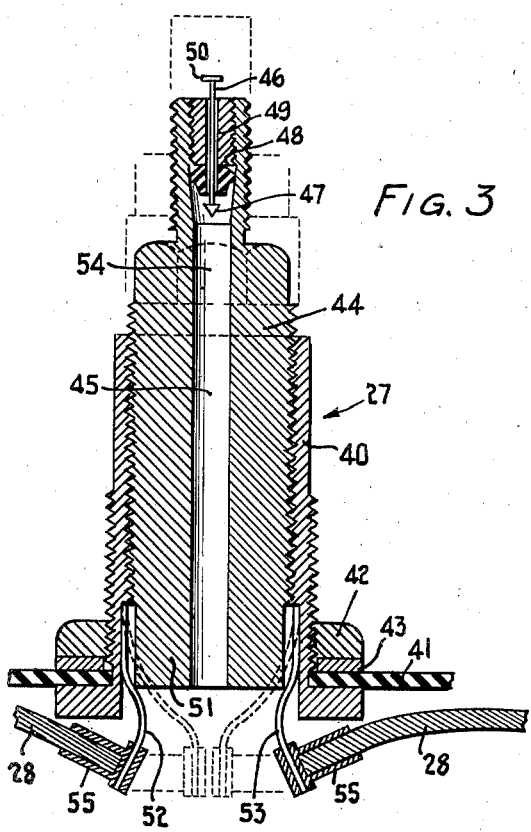
Fig. 3 is a vertical sectional view of a main valve according to the present invention.

Referring now to Fig. 3, wherein these details are best illustrated, it will be observed that the main valve generally designated at 27 comprises a flanged exteriorly threaded sleeve 40 adapted to be mounted in an opening in the tire wall 41 by means including interiorly threaded annulus 42 abutting against a gasket member 43 substantially as shown. The interior of said member 40 is provided with threading adapted to engage with and rotatably hold a threaded substantially cylindrical member 44 having an opening 45 passing therethrough, said member 44 carrying in the upper portion thereof a check valve comprising a sliding member 46 carrying at an end thereof a valve 47 adapted to seat against the portion 48 of the member 49, said last mentioned member being secured by means including threads or the like in the mouth of the opening 45 passing through said member 44. When fluid pressure in the passage 45 exceeds fluid pressure outside the valve, the member 47 is seated against the end portion 48 of the member 49 whereby egress of fluid through said valve is at least largely precluded. When it is desired to permit fluid to enter through the valve, member 46 is pressed downwardly, as for example by engagement of the part 50 thereof with appropriate means (not shown) thereby unseating the valve 47 from the end portion 48 of the member 49.

As hereinbefore mentioned, the member 44 is rotatable within the portion of the sleeve 40, being associated therewith by means of threads substantially as shown. Accordingly, as rotative movement is imparted to said member 44 it will tend to move coaxially relative to the member 40. The lower portion of the member 44 generally indicated at 51 has threaded parts cut away whereby the resilient spring-like members 52 and 53 mounted on bottom portions of the sleeve 40 can be moved by coaxial movement of the member 44, that is to say, when the member 44 is moved upwardly within the member 40 whereby the end part 51 ceases to engage with the resilient members 52 and 53, the latter at least tend to assume the position shown in phantom in Fig. 3, but when the member 44 is moved downwardly within the sleeve 40 said members 52 and 53 are moved outwardly to assume substantially the position shown in full line in Fig. 4; hence, it will be seen that movement of the members 52 and 53 can be controlled from the exterior of the tire by engagement of an appropriate tool with the hexagonal head 54 of the member 44 whereby rotative movement can be imparted thereto.

The members 52 and 53 are connected at their free ends with the flexible resilient cable 28 hereinbefore alluded to, by means including the connector members 55 whereby as the member 44 is moved downwardly there will be at least a tendency toward expansion or increase in size of the circle defined by the cable 28. It will be apparent therefore, that downward movement of the member 44 within the sleeve 40 moves the cable 28 toward the wall 33 common to the various unit chambers thereby actuating the unit valve mechanisms as hereinbefore described. It will also be apparent that as the member 44 is moved outwardly relative to the sleeve 40 the circle defined by the cable or flexible member 28 will be substantially diminished in size thereby permitting pneumatic control of the unit valves connected with the various unit chambers. Hence, it will be seen that by augmenting the circumferential length of the circle defined by the member 28 as aforesaid, the unit valves associated with the unit chambers can be actuated from the exterior of the tire if desirable.

In use, the pneumatic tire according to the present invention is mounted upon a wheel in substantially the manner employed in conjunction with tires of the known type, due regard being had however, for the projecting annular portion 25 of the type according to the present invention. When it is desired to inflate the tire, this is accomplished in the usual manner inasmuch as an increase in pressure within the chamber 26 will in turn actuate the valves associated with the various unit chambers, thereby permitting fluid to flow into said chambers until a substantial equilibrium is reached between the pressure of fluid in one chamber and in another. When it is desired to deflate all of the unit chambers comprising the pneumatic tire according to the present invention, the inner rotatably threaded portion 44 of the main valve 27 is opened thereby opening the various unit valves in the manner hereinbefore described.

It will be apparent that one or several of the unit chambers comprising the pneumatic tire according to the present invention, can be deflated as, for example, by puncturing without altering pneumatic conditions in the other unit chambers of the tire.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. An inflatable pneumatic tire of the type described comprising a first annular chamber, radially positioned walls within said chamber dividing same into a plurality of segmental pneumatically isolated unit chambers, a second annular chamber concentric but within said first chamber, unit fluid control means associated with each of said unit chambers adapted to control flow of fluid between said second chamber and said unit chambers, said unit control means comprising a valve seat mounted in an opening formed in a wall of said unit chamber, a normally freely floating valve member slidable within said valve seat, said valve member being pneumatically actuated, when fluid pressure within said unit chamber exceeds fluid pressure in said second chamber, to engage with said seat whereby flow of fluid through said valve is at least mostly precluded, a main fluid control means associated with said second chamber adapted to control flow of fluid between said chamber and parts exterior of said tire, said main fluid control means comprising a valve seat mounted in an opening formed in a wall of said chamber, a normally freely floating valve member slidable within said valve seat, said valve member being pneumatically actuated, when fluid pressure within said chamber exceeds external fluid pressure, to engage with said seat whereby flow of fluid through said valve is at least mostly precluded, and means associated with said main fluid control means actuable from the exterior of said tire, adapted to unseat unit valve members, said means including a resilient annulus, positioned within said second chamber, engageable with said unit valve members whereby alterations in the apparent circumferential length of said annulus causes unseating of said unit valve members, and means for altering the apparent length of said annulus.

2. An inflatable pneumatic tire of the type described comprising a first annular chamber, radially positioned walls within said chamber dividing same into a plurality of segmental pneumatically isolated unit chambers, a second annular chamber concentric but within said first chamber, unit fluid control means associated with each of said unit chambers adapted to control flow of fluid between said second chamber and said unit chambers, said unit control means comprising a valve seat mounted in an opening formed in a wall of said unit chamber, a normally freely floating valve member slidable within said valve seat, said valve member being pneumatically actuated, when fluid pressure within said unit chamber exceeds fluid pressure in said second chamber, to engage with said seat whereby flow of fluid through said valve is at least mostly precluded, a main fluid control means associated with said second chamber adapted to control flow of fluid between said chamber and parts exterior of said tire, said main fluid control means comprising a valve seat mounted in an opening formed in a wall of said chamber, a normally freely floating valve member slidable within said valve seat, said valve member being pneumatically actuated, when fluid pressure within said chamber exceeds external fluid pressure, to engage with said seat whereby flow of fluid through said valve is at least mostly precluded, and means associated with said main fluid control means actuable from the exterior of said tire, adapted to unseat unit valve members, said means including a resilient annulus, positioned within said second chamber, engageable with said unit valve members whereby alterations in the apparent circumferential length of said annulus causes unseating of said unit valve members, and means for altering the apparent length of said annulus comprising a pair of resilient arms mounted on a portion of said main valve, normally positioned adjacent each other, means for spreading said arms away from each other comprising a plunger member carried in a part of said main valve, said arms being connected to end portions of said annulus at a split therein whereby spreading of said arms causes alteration in the apparent circumferential length of said annulus and unseats said unit valve members.

JUÁN RAMÓN MUNÉS.
BRAULIO PÉREZ MARCHANT.